Feb. 15, 1944.  E. L. VIDAL ET AL  2,342,023
LAMINATED STRUCTURE AND METHOD OF MAKING SUCH STRUCTURE
Filed Aug. 23, 1940  2 Sheets-Sheet 1
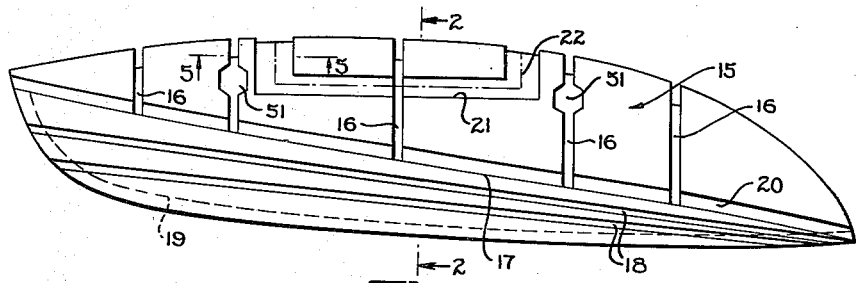
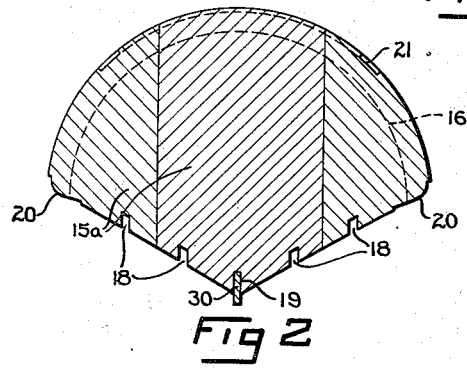
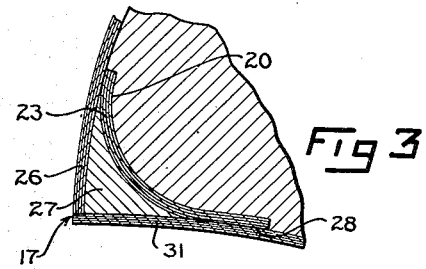
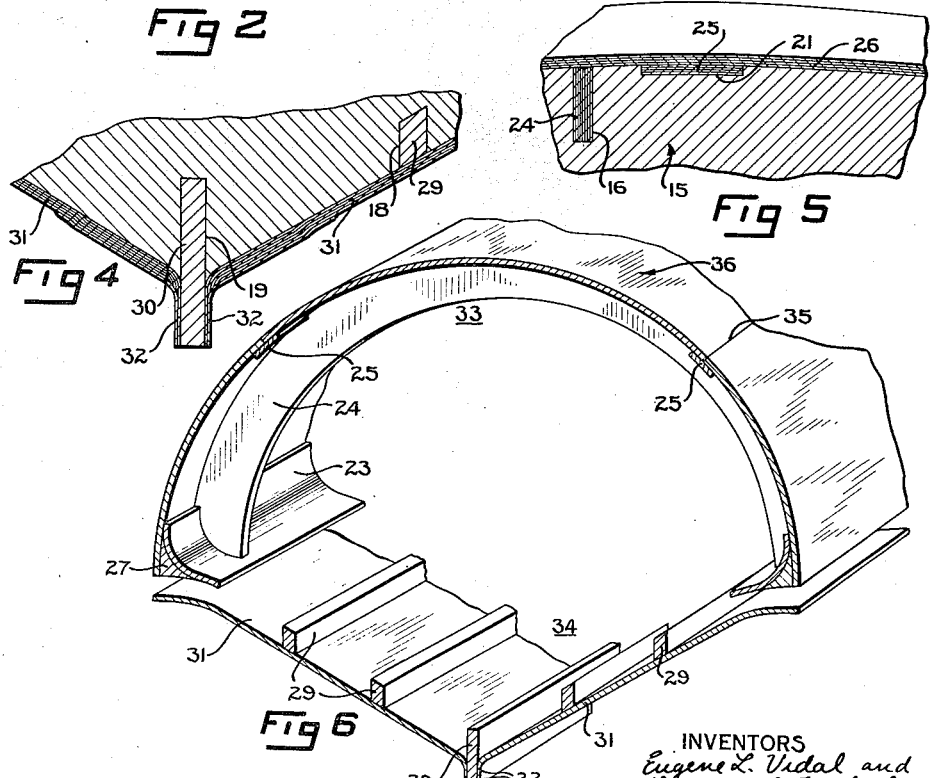
INVENTORS
Eugene L. Vidal and
By Laurence J. Markoefer
F. Bascom Smith
ATTORNEY Feb. 15, 1944. E. L. VIDAL ET AL 2,342,023
LAMINATED STRUCTURE AND METHOD OF MAKING SUCH STRUCTURE
Filed Aug. 23, 1940 2 Sheets-Sheet 2
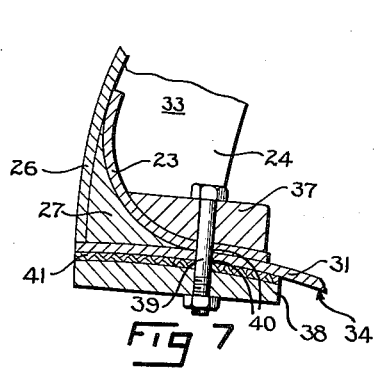
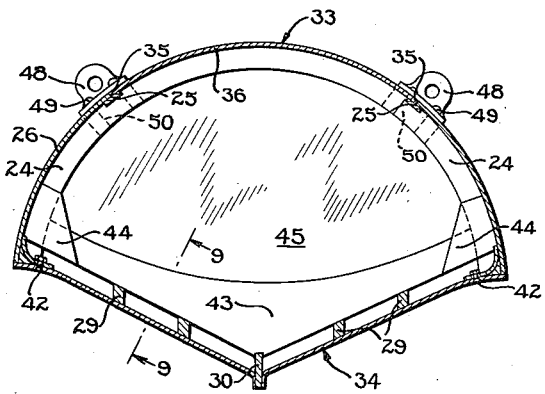
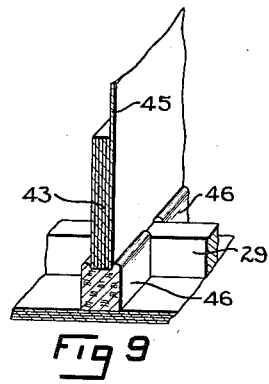
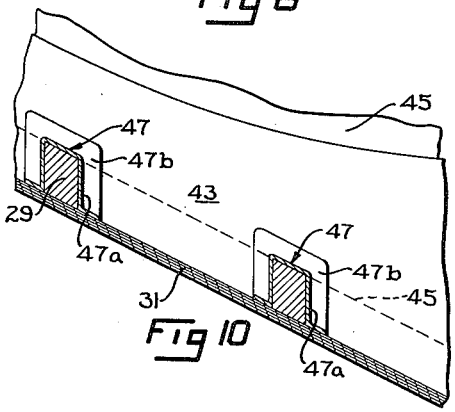
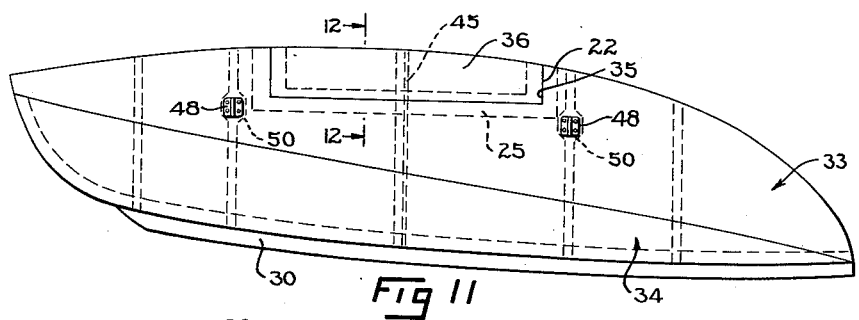
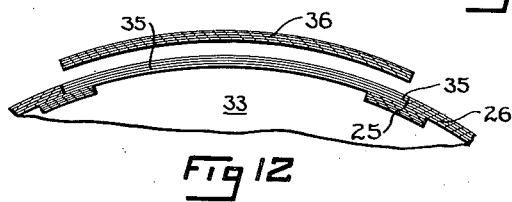
INVENTORS
Eugene L. Vidal and
BY Laurence J. Markoefer
F. Bascom Smith
ATTORNEY Patented Feb. 15, 1944

2,342,023

UNITED STATES PATENT OFFICE 2,342,023

LAMINATED STRUCTURE AND METHOD OF MAKING SUCH STRUCTURE

Eugene L. Vidal, New York, N. Y., and Laurence J. Marhoefer, Wood-Ridge, N. J., assignors, by mesne assignments, to Vidal Corporation, a corporation of Delaware Application August 23, 1940, Serial No. 353,900

8 Claims. (Cl. 9—6)

This invention relates to laminated structures and to methods of fabricating said structures, and more particularly to methods for molding laminations of adhesively treated materials into structural units.

It is an object of the invention to provide a novel method of fabricating several sections of a structure and thereafter securely joining said sections to form the structure.

Another object is to provide a novel method of forming a plurality of molded sections into a structural unit and of reinforcing said unit.

A further object is to provide a novel method of forming a novel reinforced hollow structure such as a float.

Another object is to provide a novel method whereby a laminated shell is separated into a plurality of waterproof compartments.

A still further object is to provide a vessel hull or other hollow member with novel water-tight bulkheads.

Still another object is to provide a novel method for eliminating surface irregularities in a molded structure having an opening and a cover therefor, thereby producing a smooth outer surface offering a minimum resistance to motion.

A still further object is to provide a novel method of forming an opening in the body of a molded laminated structure and of reinforcing the edges of said opening.

The above and other objects and novel features of the present invention will more fully appear from the following detailed description when the same is read in connection with the accompanying drawings. It is to be expressly understood, however, that the drawings are for purposes of illustration only and are not intended as a definition of the limits of the invention, reference being had for this latter purpose to the appended claims.

In the drawings, wherein like reference characters refer to like parts throughout the several views, Fig. 1 is a view in elevation of a form or mold which may be utilized for molding a float in accordance with the novel method of the present invention;

Fig. 2 is a sectional view taken substantially along line 2—2 of Fig. 1 with a keel strip shown positioned for molding;

Fig. 3 is a fragmentary enlarged view of a portion of the mold section of Fig. 2 showing laminations positioned thereon;

Fig. 4 is a similar view of the portion of the mold section at the keel;

Fig. 5 is an enlarged sectional view with parts broken away, the section being taken substantially along line 5—5 of Fig. 1 and showing the laminations positioned for molding;

Fig. 6 is a view in perspective, with parts broken away, of the sections molded on the form of Fig. 2, the mold having been removed from said sections;

Fig. 7 is a fragmentary sectional view showing the step whereby the sections of Fig. 6 are fabricated into a single unit;

Fig. 8 is a transverse sectional view through the fabricated float with the reinforcing and bulkhead members positioned therein;

Fig. 9 is a view in perspective, illustrating a novel method and means for rendering bulkhead members water-tight;

Fig. 10 is an enlarged fragmentary view of a section similar to that of Fig. 8 showing another bulkhead embodiment;

Fig. 11 is a view in elevation of a novel float fabricated by the novel method of this invention; and Fig. 12 is a sectional view taken substantially along line 12—12 of Fig. 11 with the cover for the opening in the float lifted from its seat.

According to the novel method comprehended by the present invention, a structural member, such as a fuselage, aircraft float or boat hull is formed in a plurality of sections from a plurality of laminations, said laminations being bonded together and shaped by a molding operation. The molded sections comprising the structure are preferably formed on a single mold and are thereafter removed from the mold and securely attached to each other, preferably by being locally remolded at their junctions.

The method is preferably carried out with veneer sheets having a thickness depending on the desired weight, thickness and strength of the structure being formed therefrom, the sheets being treated with a suitable adhesive. An adhesive of the thermoplastic group, such as polyvinyl butyral, is preferred although it is possible to employ other adhesives, for example, of the types adapted to be set by chemical reaction and requiring the application of pressure only during molding or of the type referred to as thermosetting adhesives. The use of one of the latter types of adhesives, as, for example, urea formaldehyde, is somewhat less satisfactory because the initial molding requires more care and time and, in the event molded structures are to be secured to each other by a further molding operation, said molded structures have to be retreated with adhesive at their junctions.

The adhesive is applied to the sheets in any suitable manner, as, for example, by being sprayed or painted thereon, or by dipping the sheets in the adhesive in a sufficient quantity to coat and impregnate the sheets. After the adhesive is applied, the sheets are permitted to season for several hours and then if a more thorough coating and impregnation are desired the application of the adhesive and the seasoning are repeated one or more times. In the fabrication of a structure having curved surfaces from sheets impregnated with a thermoplastic, it is preferable to mix a plasticizer, for example, dibutyl phthalate, with the adhesive to make the impregnated sheets more flexible, the quantity of plasticizer added to the thermoplastic varying inversely as the radius of curvature of the shape into which the veneer sheets are to be formed.

A mold 15 is provided upon which the desired structural shape is formed from the adhesively treated veneer sheets and, as shown, said mold has a contour conforming to the shape of a float and is preferably constructed in several sections 15a (Fig. 2) in order to be readily removable from the structure formed thereon. A plurality of longitudinally spaced lateral grooves 16 are provided in the top portion of said mold being located where reinforcing ribs are desired on the interior of the float structure, and in the illustrated embodiment said grooves extend on both sides of the mold to a line 17 which corresponds to the chine line of the float (Fig. 1). A plurality of longitudinal grooves 18 are provided in the portion of said mold below chine line 17 and said grooves include a groove 19 along the longitudinal center line of said mold, i. e., along the keel line of the float. The mold at chine 17 is preferably rounded and provided with a recess or indentation 20 (Figs. 2 and 3). A groove 21 is formed in the upper portion of the mold extending on both sides of proposed boundaries 22 (Fig. 1) of an opening to be provided in the float whereby the interior thereof can be reached.

The external surface of mold 15 is preferably coated with a non-adhesive material, such as Cellophane or cellulose acetate, and then a plurality of adhesively treated strips, laminations, or preformed laminated members 23 are positioned in recess 20 (Fig. 3), said strips or members having an aggregate thickness equal to the depth of said recess and being temporarily secured in position on the mold, for example, by cleats (not shown). Reinforcing strips 24, preferably laminated and preferably preformed by molding, are positioned in grooves 16 after recess 20 is filled and one or more laminations 25 are positioned in groove 21 to a thickness equal to the depth of the latter groove (Fig. 5). Strips 24 as well as other reinforcing members are preferably formed as parts of a large molded block from which a plurality of said strips is cut after molding. The portion of the top surface of laminations 25 within the boundary 22 of the float opening is then coated with a layer, preferably of the same non-adhesive material utilized on the mold. The entire upper surface of the mold is covered with a plurality of laminations 26, said laminations extending to chine line 17 substantially at a tangent to the curve of recess 20 (Fig. 3) and the space between laminations 26 and laminations 23 is filled with a strip of material 27, said strip being shown as a solid piece although it is possible to utilize a laminated strip molded to the proper shape or to fill said space with a plurality of laminations.

In order to mold the section of the float below the chine line simultaneously with that above on a single mold, and yet make it possible to remove said mold at the completion of the molding operation, a layer of non-adhesive material 28 (Fig. 3), such as cellulose acetate or Cellophane, is provided on the surfaces of strip 27 and laminations 26 and 28 which constitute the surface to which the portion of the molded float structure below the chine is attached. Surfaces can be rendered non-adhesive either in the above-described manner or by having the surface free of adhesive, and, in the latter case, any adjacent surfaces that are to be separable from the non-adhesive surface must also be free of adhesive. Thereafter, strips 29 (Fig. 4) adapted to fill grooves 18 are properly positioned therein to be flush with the surface of mold 15 and a keel strip 30, which preferably extends downwardly beyond the surface of mold 15, is located in groove 19, said strips being comprised of solid pieces or a plurality of laminations preferably preformed into a single piece of the required shape. The mold surfaces from the chine 17 to keel 19 are thereafter covered with a plurality of laminations 31 and the latter interlock with a plurality of laminations 32 which cover the sides of keel strip 30.

When the above-described structure is properly assembled on the mold in the above-described manner and the exposed surfaces rendered non-adhesive either by being covered with a non-adhesive, for example, cellulose acetate, or by being free of adhesive, the assembly and mold are subjected to a molding operation which includes the application of pressure whereby the laminations are caused to closely conform to the mold shape while the adhesive is activated and caused to set. This is preferably accomplished by inserting the mold and the assembly thereon into a flexible, substantially impervious container and then placing said container into a pressure tank wherein said container is preferably subjected to fluid pressure. The interior of the container is in communication with the exterior of the tank so that the pressure in the latter will exhaust said container and cause the walls thereof to closely engage the laminations on the mold. The pressure is preferably applied by introducing compressed air and/or steam into the tank, the latter being used when the laminations have been treated with thermoplastic or thermosetting adhesives and heat is desired for activating the adhesive. The pressure remains applied until the adhesive has set and then the mold and the structure molded thereon are removed from the tank and from the container, the molded structure being free of the mold since the latter is either non-adhesive or coated with non-adhesive material. As a result of the molding or vulcanization process, two sections 33 and 34 are formed, being separable because of the non-adhesive property of the junction surfaces, section 34 comprising the float portion below the chine 17 (Fig. 6). In Figs. 6 to 8, the molded laminated members are shown as being solid in order to clarify these several views.

An opening 35 is then provided in upper section 33 (Figs. 6, 11 and 12) by cutting along boundary 22 to a depth equal to the thickness of laminations 26 and removing the portion of section 32 included in this boundary. This portion is free of and readily removable from laminations 26 because of the non-adhesive character of the surface of the latter within boundary 22 and, when removed, said portion constitutes a close fitting cover 36 for opening 35. It will be noted that by this novel method of fabrication, the edges of said opening are reinforced and provided with an inwardly extending shoulder upon which cover 36 can seat and that said cover, when seated, does not produce any irregularities in the smooth, upper surface of the float. The non-adhesiveness of cover 36 and the sill or seat constituted by laminations 26 during molding may be effected by having the adjacent surfaces of said seat material and said cover material free of adhesive.

Sections 33 and 34 are thereafter joined, preferably by a molding process which causes the said sections to be bonded together as effectively as the laminations constituting the walls of said sections. To accomplish this, the non-adhesive material previously applied to the junction surfaces is removed and in some instances, depending on the type of adhesive being used and the method of removing the non-adhesive material, said surfaces are retreated with adhesive.

If a thermoplastic or thermo-setting adhesive has been used to impregnate the sheets, the molding is carried out by the local application of heat and pressure to the junction surfaces, for example, by means of a pair of pressure plates 37 and 38 (Fig. 7) connected by a bolt 39 extending through openings 40 in sections 33 and 34. An electrical heating pad 41 is carried by plate 38 and said pad is preferably adjacent the surface of section 34. Bolts 40 are tightened to produce the pressure required to effect molding and pad 41 is energized to apply the necessary heat so that sections 33 and 34 are intimately bonded to each other along their edges. This remolding along the edges of the sections can be accomplished in a single operation but is preferably carried out in several steps, plate 37 being positioned on the interior of section 33 through opening 35. At the completion of the molding, openings 40 are plugged and made water-tight by suitable means, such as screws 42, the latter also serving to increase the effectiveness of the bond between said sections.

The float hull is then further reinforced by a plurality of frame members 43 (Fig. 8) suitably shaped to fit between the ends of transverse ribs 24 in the same lateral plane with said ribs and to rest on longitudinal ribs 29. Members 43 are secured in position on the interior of the float by means of gusset plates 44, at least one of said gusset plates being located at each end of each of said members so as to overlap the face of said member and the face of the adjoining end of rib 29. Gusset plates 44 are secured to frames 43 and ribs 29, preferably by being molded thereto in a similar manner to that in which sections 33 and 34 are molded together with the exception that clamps instead of bolts are preferably used to apply the pressure to the pressure plates.

In the fabrication of hull structures, such as float 33, 34, which are adapted for use as water craft, it is desirable to divide the interior of said structures into a plurality of waterproof compartments and, accordingly, novel method and means are provided whereby this can be accomplished. As shown, a member 45 (Figs. 8 and 9) comprised of one or more layers of adhesively treated veneer or canvas is preferably molded to the face of one of frames 43 and to the face of the corresponding one of ribs 24 so that, where a bulkhead is to be provided, ribs 24 and frames 43 constitute a frame structure to which the bulkhead web 45 is attached. The space between the longitudinal ribs 29 and the bottom edge of frames 43 are filled and rendered water-tight by means of cork fillers 46, one of which is compressed in each of the spaces so as to closely engage the walls of said spaces. Cork fillers 46 are "cut oversize" and are novelly positioned by being "boiled" and then inserted while hot. When in the latter condition, said cork fillers can be readily pressed into position, although when cooled the same will tightly engage the sides of stringers 29 and the bottoms of frames 43.

Another method for rendering the bulkheads waterproof below the edge of web 45 is illustrated in Fig. 10 and, as shown, consists in forming frame members 43 so that the latter extend to skin 31 of the float, said members being suitably notched to fit around stringers 29. A sheet 47, for example, of plastic or adhesively treated fabric, such as canvas, has a portion 47a thereof wrapped about each of said stringers and the remainder 47b secured to the wall of frame 45 which adjoins said stringer, for the purpose of rendering the joint between said frame and said stringer waterproof.

The float is adapted to be secured to a seaplane wing, for example, and is preferably provided with a plurality of brackets 48 whereby this is accomplished. Brackets 48 are shown as being secured mechanically to the upper skin of the float by means of bolts 49 and, if desired, reinforcing members 50 (Figs. 8 and 11) are molded simultaneously with the ribs 24 and constitute supports on the interior of the float to which said brackets can be attached. To mold said reinforcing members, grooves 51 are provided in mold 15 (Fig. 1) at points where said brackets are to be attached, being filled prior to molding by a suitable number of adhesively treated laminations or solid pieces to form said reinforcing members.

There is thus provided a novel method for molding one or more structural units from a plurality of adhesively treated laminations, for reinforcing said units and for joining a plurality of said units to produce a desired structural shape. There is also provided a novel float hull member having a novel reinforcing structure and bulkheads, said bulkheads being positioned and rendered water-tight in a novel manner. A novel method is also provided whereby said hull member can be equipped with an opening having reinforced edges and a close fitting and accurately shaped cover.

It is to be expressly understood that the invention is not limited to the single embodiment thereof illustrated and described. For example, it will now be apparent to those skilled in the art that the methods herein described could be readily used for the fabrication of various other structures and that the latter can be formed on one or more molds and in more than two sections, fuselages, boat hulls and wings having been satisfactorily formed by this method. Various other changes can be made in the design and arrangement of parts and in the manner in which the particular steps of the method are carried out without departing from the spirit and scope of the invention. For a definition of the invention, reference will be primarily had to the appended claims.

What is claimed is:

1. The method of forming an opening having a close fitting cover in a molded laminated structure which consists in providing a groove in the mold upon which said structure is formed, said groove extending on both sides of the boundary of the proposed opening, filling said groove with one or more adhesively treated laminations, covering the portion of the top surface of said laminations included in the boundary of said opening with non-adhesive material, superposing additional laminations constituting the shell of the molded structure on said mold, molding said structure, and cutting said shell laminations along the boundary of the opening.

2. The method of forming an opening having a close fitting cover in a molded laminated structure which consists in providing a groove in the mold upon which said structure is formed, said groove extending on both sides of the boundary of the proposed opening, filling said groove with one or more adhesively treated members, superposing sheets of adhesively treated material adapted to constitute the shell of the molded structure on said mold, rendering adjacent surfaces of said sheets and said members non-adhesive within the boundary of said opening, molding said structure, and cutting said shell along the boundary of the opening.

3. The method of providing a molded laminated structure with an opening having a close fitting door or cover which consists in positioning a plurality of adhesively treated strips to engage the inside layer of the laminations adapted to constitute said structure on both sides of the boundary of the proposed opening, rendering non-adhesive the adjacent surfaces of said inside layer and said strips within said boundary, molding said structure laminations and said strips, cutting only the structure along said boundary, and removing the portion of said structure within said boundary.

4. The method of fabricating a hollow hull structure from a plurality of adhesively treated laminations which consists in molding the shell of said structure, simultaneously securing reinforcing members thereto as a part of said molding operation, removing said reinforced shell from the mold and thereafter securing a plurality of transverse members to the interior of the shell structure, by bonding said transverse members to said reinforcing members, said transverse members including one or more webs adapted to occupy substantially the entire transverse cross-sectional area of said hull interior and thereby form one or more bulkhead sections in said structure, and rendering said bulkhead sections watertight.

5. The method of fabricating a structure which includes superposing a plurality of adhesively treated laminations on part of a mold which conforms to the shape of said structure, and superposing other adhesively treated laminations on another adjacent part of said mold so as to provide adjacent laminated sections having contiguous junction surfaces, said sections being in the position they are ultimately to occupy in the completed structure, rendering said surfaces non-adhesive so as to prevent bonding of said sections to each other while on the mold, molding said laminated sections into structural units conforming to the shape of that part of the mold on which each is placed, separating said units from the mold, and securing said units to each other at said surfaces to form said structure.

6. The method of fabricating a hollow reinforced structure which includes treating a plurality of laminations and reinforcing strips with adhesive, positioning said strips in grooves provided in the surface of a mold which conforms to the shape of said structure, superposing said laminations on different parts of the surface of said mold and in contacting relation to said reinforcing strips so as to provide adjacent laminated sections having contiguous junction surfaces, said sections being in the position they are ultimately to occupy in the completed structure, rendering the junction surfaces of said sections non-adhesive so as to prevent bonding of said sections to each other while on the mold, molding said sections into separable reinforced structural units conforming to the shape of that part of the mold on which they are placed, separating said units from the mold, and securing said units to each other to form said hollow reinforced structure.

7. The method of fabricating a structure which consists in treating a plurality of veneer laminations with an adhesive, superposing said laminations on different parts of the surface of a mold which conforms to the shape of said structure so as to provide adjacent laminated sections having contiguous junction surfaces, rendering said sections of said laminations on different parts of the surface of the mold separable after molding by maintaining said junction surfaces thereof non-adhesive, molding said sections of laminations into structural units, said molding including the application of fluid pressure to said laminations, separating said units from said mold, and permanently joining said units together to form said structure by reassembling hem in the same positional relation they had during molding and locally applying heat and pressure to mold together the junction surfaces maintained non-adhesive during the first molding.

8. The method of fabricating a float which includes treating a plurality of laminations and reinforcing strips with an adhesive, positioning said reinforcing strips in grooves of a mold conforming to the shape of said float, superposing said laminations on different parts of the surface of said mold and in contacting relation with said reinforcing strips so as to provide adjacent laminated sections having contiguous junction surfaces along the chine line of said float, rendering said junction surfaces non-adhesive so as to prevent bonding of said sections to each other while on the mold, molding said laminations by the application of heat and fluid pressure into structural units of a float separable along the chine line, removing said units from the mold, and combining said units into a unitary structure by applying heat and pressure thereto at said junction surfaces.

EUGENE L. VIDAL.
LAURENCE J. MARHOEFER.